US012503631B2

(12) United States Patent
Yan et al.

(10) Patent No.: US 12,503,631 B2
(45) Date of Patent: Dec. 23, 2025

(54) CURABLE SILICONE PRESSURE SENSITIVE ADHESIVE EMULSION AND METHOD FOR ITS PREPARATION

(71) Applicants: Dow Silicones Corporation, Midland, MI (US); Dow Global Technologies LLC, Midland, MI (US)

(72) Inventors: Qiangqiang Yan, Shanghai (CN); Yunlong Guo, Shanghai (CN); Wenjie Chen, Shanghai (CN); Li Ding, Shanghai (CN); Peng Gao, Shanghai (CN); Yan Zhou, Shanghai (CN); Zhihua Liu, Shanghai (CN)

(73) Assignees: Dow Global Technologies LLC, Midland, MI (US); Dow Silicones Corporation, Midland, MI (US)

( * ) Notice: Subject to any disclaimer, the term of this patent is extended or adjusted under 35 U.S.C. 154(b) by 673 days.

(21) Appl. No.: 17/913,228

(22) PCT Filed: May 27, 2020

(86) PCT No.: PCT/CN2020/092554
§ 371 (c)(1),
(2) Date: Sep. 21, 2022

(87) PCT Pub. No.: WO2021/237499
PCT Pub. Date: Dec. 2, 2021

(65) Prior Publication Data
US 2023/0138123 A1 May 4, 2023

(51) Int. Cl.
| | | |
|---|---|---|
| C09J 183/04 | (2006.01) |
| C08G 77/16 | (2006.01) |
| C08J 3/03 | (2006.01) |
| C08K 5/13 | (2006.01) |
| C08K 5/14 | (2006.01) |

(52) U.S. Cl.
CPC ............ *C09J 183/04* (2013.01); *C08G 77/16* (2013.01); *C08J 3/03* (2013.01); *C08K 5/13* (2013.01); *C08K 5/14* (2013.01); *C09J 2301/302* (2020.08); *C09J 2400/163* (2013.01); *C09J 2483/00* (2013.01)

(58) Field of Classification Search
CPC ................ C09J 183/04; C09J 2301/302; C09J 2483/00; C09J 7/38; C08G 77/16; C08G 77/04; C08G 77/70; C08J 2483/02; C08J 2383/02; C08J 2383/04; C08J 2483/04; C08L 83/00; C08L 83/04; C08L 71/02; C08K 5/0025; C08K 5/14; C08K 5/04
See application file for complete search history.

(56) References Cited

U.S. PATENT DOCUMENTS

| | | |
|---|---|---|
| 2,676,182 A | 4/1954 | Daudt et al. |
| 4,611,042 A | 9/1986 | Rivers-Farrell et al. |
| 4,774,310 A | 9/1988 | Butler |
| 5,916,981 A * | 6/1999 | Cifuentes ............... C09J 183/10 524/378 |
| 8,580,073 B2 | 11/2013 | Behl et al. |
| 9,593,209 B2 | 3/2017 | Dent et al. |
| 9,732,191 B2 | 8/2017 | Cifuentes et al. |
| 2017/0137678 A1 | 5/2017 | Ding et al. |

FOREIGN PATENT DOCUMENTS

| | | |
|---|---|---|
| CN | 101177596 | 5/2008 |
| JP | 3516410 | 4/2004 |
| JP | 4761049 | 8/2011 |
| WO | 2015/196400 | 12/2015 |

* cited by examiner

*Primary Examiner* — Rachel Kahn
(74) *Attorney, Agent, or Firm* — Catherine U. Brown

(57) ABSTRACT

A method for preparing a curable silicone pressure sensitive adhesive emulsion includes preparing a dispersion of benzoyl peroxide and a phenoxy-functional alcohol and thereafter combining the dispersion with the other starting materials of the emulsion.

14 Claims, No Drawings

CURABLE SILICONE PRESSURE SENSITIVE ADHESIVE EMULSION AND METHOD FOR ITS PREPARATION

CROSS REFERENCE TO RELATED APPLICATIONS

This application is a U.S. national stage filing under 35 U.S.C. § 371 of PCT Application No. PCT/CN20/092554 filed on 27 May 2020, currently pending. PCT Application No. PCT/CN20/092554 is hereby incorporated by reference.

CROSS REFERENCE TO RELATED APPLICATIONS

None.

TECHNICAL FIELD

This invention relates to a curable silicone pressure sensitive adhesive emulsion and method for its preparation. The curable pressure sensitive adhesive emulsion contains a peroxide initiator and can be cured to form a pressure sensitive adhesive with good adhesion and that leaves no or low residue after removal from stainless steel substrates after exposure to high temperatures.

INTRODUCTION

Silicone pressure sensitive adhesive emulsions may cure via platinum catalyzed addition reaction, peroxide initiated free radical reaction, or aminosilane catalyzed condensation reaction. However, platinum catalyzed systems may suffer from the drawback of being expensive, and aminosilane catalyzed systems may suffer from the drawback of unstable adhesion or poor cohesion. For solvent borne PSAs, benzoyl peroxide may be used. However, benzoyl peroxide is a crystalline solid, which is difficult to dissolve or disperse in water and therefore difficult to use in waterborne silicone pressure sensitive adhesives.

BRIEF SUMMARY OF THE INVENTION

A method is disclosed for preparing a curable silicone pressure sensitive adhesive emulsion. The method comprises:
1) preparing a dispersion comprising
   A) >0 to <55 weight % benzoyl peroxide;
   B) 0 to ≤25 weight % water; and
   C) >20 weight % a phenoxy-functional alcohol selected from the group consisting of 1-phenoxy-2-propanol and 2-phenoxyethan-1-ol; and
2) combining the dispersion with starting materials comprising
   D) a bis-hydroxyl-terminated polydiorganosiloxane gum;
   E) a polyorganosilicate resin;
   F) an alcohol ethoxylate surfactant; and
   G) additional water.

DETAILED DESCRIPTION

The curable silicone pressure sensitive adhesive emulsion described herein can be made with a benzoyl peroxide dispersion. The dispersion comprises A) benzoyl peroxide, optionally B) water, and C) a phenoxy-functional alcohol selected from the group consisting of 1-phenoxy-2-propanol and 2-phenoxyethan-1-ol.

A) Benzoyl Peroxide

Starting material A), the benzoyl peroxide, has formula

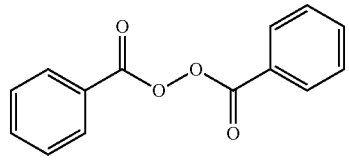 [SMILES: O=C(OOC(=O)c1ccccc1)c1ccccc1]

and CAS #94-36-0. Benzoyl peroxide is commercially available, e.g., from Millipore Sigma of St. Louis, Missouri, USA, under the tradename LUPEROX™. The LUPEROX™ products may contain 75% to 98% benzoyl peroxide and 2% to 25% of B) water. The amount of benzoyl peroxide used to prepare the dispersion is sufficient to provide <55%, alternatively ≤50%, and alternatively ≤38% based on the weight of the dispersion. At the same time the concentration of benzoyl peroxide is sufficient to provide ≥15%, alternatively ≥20%, and alternatively ≥37% based on weight of the dispersion. Alternatively, the amount of benzoyl peroxide may be >0 to <55%, alternatively 15% to <55%, alternatively 20% to 50%, and alternatively 37% to 50% of benzoyl peroxide solids based on the weight of the dispersion. The balance of the dispersion may comprise B) the water (which may be introduced with the benzoyl peroxide solids or added separately, or both) and C) the phenoxy-functional alcohol.

B) Water

Starting material B) is water. The water is optional and not generally limited, and may be utilized neat (i.e., absent any carrier vehicles/solvents), and/or pure (i.e., free from or substantially free from minerals and/or other impurities). For example, the water may be processed or unprocessed before being added to the dispersion described above. Examples of processes that may be used for purifying the water include distilling, filtering, deionizing, and combinations of two or more thereof, such that the water may be deionized, distilled, and/or filtered. Alternatively, the water may be unprocessed (e.g. may be tap water, i.e., provided by a municipal water system or well water, used without further purification). When present, all or a portion of the water may be introduced with the benzoyl peroxide solids.

The water may be utilized in any amount of 0 to 40% based on weight of the dispersion, and the exact amount may be selected by one of skill in the art, depending on various factors, e.g., the equipment to be used for preparing the curable silicone pressure sensitive adhesive emulsion and the scale. Alternatively, the water may be present in an amount of 2% to 25% based on weight of the dispersion.

C) Phenoxy-Functional Alcohol

Starting material C) in the dispersion is a phenoxy-functional alcohol selected from the group consisting of 1-phenoxy-2-propanol and 2-phenoxyethan-1-ol.

1-Phenoxy-2-propanol has formula

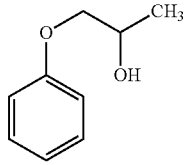

and CAS #770-35-4. 2-Phenoxyethan-1-ol has formula

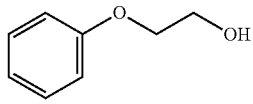

and CAS #122-99-6. 1-Phenoxy-2-propanol and 2-phenoxy ethanol are both commercially available, e.g., from Sigma-Aldrich of St. Louis, Missouri, USA. The phenoxy-functional alcohol may be the balance of the dispersion described above, e.g., the amount of the phenoxy-functional alcohol in the dispersion may be >20% to 78% based on weight of the dispersion; alternatively, the amount of the phenoxy-functional alcohol may be 25% to 78%, alternatively 25% to 70%, and alternatively 37% to 50%, based on weight of the dispersion.

The dispersion described above comprises starting materials A) and C). Alternatively, the dispersion may comprise starting materials A), B), and C); alternatively the dispersion may consist essentially of starting materials A), B), and C); and alternatively this dispersion may consist of starting materials A), B), and C). Before combining the dispersion with any other starting materials used to prepare the curable silicone pressure sensitive adhesive emulsion, the dispersion may be free of polyorganosiloxane components, e.g., silicone oils such as trimethylsiloxy-terminated polydimethylsiloxane. Without wishing to be bound by theory, it is thought that a silicone oil may be detrimental to the activity of the benzoyl peroxide.

The dispersion may be formed by any convenient means, such as mixing. Starting materials A), B), and C) may be combined in any order, under ambient conditions or with heating using any convenient equipment such as a batch kettle equipped with an agitator or continuous mixing equipment such as a twin screw extruder.

To form the curable silicone pressure sensitive adhesive emulsion, the benzoyl peroxide dispersion described above may be combined with starting materials comprising: D) a polydiorganosiloxane gum; E) a polyorganosilicate resin; F) an alcohol ethoxylate surfactant; and G) additional water. The curable silicone pressure sensitive adhesive emulsion may optionally further comprise one or more of H) a polydiorganosiloxane polymer, I) a solvent, and J) a biocide.

D) Gum

Starting material D) in the curable silicone pressure sensitive adhesive emulsion is a bis-hydroxyl-terminated polydiorganosiloxane gum (gum). The gum may have Mn 300,000 g/mol. The gum may have formula:

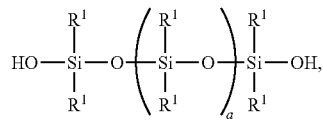

where each $R^1$ is an independently selected monovalent hydrocarbon group; and subscript a has a value sufficient to give the gum a number average molecular weight (Mn) 300,000 g/mol, alternatively 300,000 g/mol to 1,000,000 g/mol, alternatively 300,000 g/mol to 400,000 g/mol, and alternatively 500,000 g/mol to 800,000 g/mol. Mn of the gum was measured by GPC according to the technique described herein.

In the formula for the gum, each $R^1$ is an independently selected monovalent hydrocarbon group. The monovalent hydrocarbon group may have 1 to 18 carbon atoms. The monovalent hydrocarbon group may be free of aliphatic unsaturation. Alternatively, each $R^1$ may have 1 to 12 carbon atoms, and alternatively 1 to 6 carbon atoms. Suitable monovalent hydrocarbon groups for $R^1$ are exemplified by alkyl groups and aromatic groups such as aryl groups and aralkyl groups. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 or more carbon atoms; and cyclic alkyl groups such as cyclopentyl and cyclohexyl. Aryl is exemplified by, but not limited to, cyclopentadienyl, phenyl, tolyl, xylyl, anthracenyl, benzyl, 1-phenylethyl, 2-phenylethyl, and naphthyl. Alternatively, each $R^1$ may be independently selected from the group consisting of alkyl and aryl. Alternatively, each $R^1$ may be independently selected from methyl and phenyl. Alternatively, each $R^1$ may be alkyl. Alternatively, each $R^1$ may be methyl.

Gums are known in the art and may be prepared by methods such as hydrolysis and condensation of the corresponding organohalosilanes or equilibration of cyclic polydiorganosiloxanes. Suitable gums for use in the curable silicone pressure sensitive adhesive emulsion are exemplified by:
   i) bis-hydroxyl-terminated polydimethylsiloxane,
   ii) bis-hydroxyl-terminated poly(dimethylsiloxane/methylphenyl)siloxane,
   iii) bis-hydroxyl-terminated poly(dimethylsiloxane/diphenyl)siloxane,
   iv) phenyl,methyl,hydroxyl-siloxy-terminated polydimethylsiloxane, and
   v) a combination of two or more of i) to iv). Alternatively, the polydiorganosiloxane gum may be selected from the group consisting of i), ii), and iii). Alternatively, the polydiorganosiloxane gum may be i).

The amount of gum used in the emulsion depends on various factors including the molecular weight of the gum selected. However, the gum may be added in an amount sufficient to provide at least 7% gum based on weight of the emulsion. At the same time the amount of gum may be up to 30% based on the weight of the emulsion. Alternatively, the amount of gum may be 7.5% to 25%, alternatively, 8% to 22%, on the same basis.

E) Resin

Starting material E) in the curable silicone pressure sensitive adhesive emulsion is a polyorganosilicate resin. The polyorganosilicate resin comprises monofunctional units ("M" units) of formula $R^M{}_3SiO_{1/2}$ and tetrafunctional units ("Q" units) of formula $SiO_{4/2}$, where each $R^M$ is an independently selected monovalent hydrocarbyl group. Suitable monovalent hydrocarbyl groups for $R^M$ may have 1 to 20 carbon atoms, alternatively 1 to 12 carbon atoms, alternatively 1 to 8 carbon atoms, alternatively 1 to 4 carbon atoms, and alternatively 1 to 2 carbon atoms. Alternatively, the hydrocarbyl groups for $R^M$ may be selected from the group consisting of alkyl groups, alkenyl groups and aryl groups; alternatively alkyl and aryl; alternatively alkyl and alkenyl; and alternatively alkyl. The alkyl groups and aryl groups are as described above for $R^1$. Alternatively, in the polyorganosilicate resin, each $R^M$ may be independently selected from the group consisting of alkyl, alkenyl, and aryl. Alternatively, each $R^M$ may be selected from methyl, vinyl, and phenyl. Alternatively, at least one-third, alternatively at least two thirds of the $R^M$ groups are methyl groups. Alternatively, the M units may be exemplified by $(Me_3SiO_{1/2})$, $(Me_2PhSiO_{1/2})$, and $(Me_2ViSiO_{1/2})$. The polyorganosilicate resin is soluble in solvents such as those described herein, exemplified by liquid hydrocarbons, such as benzene, toluene, xylene, ethyl benzene, heptane, and combinations of two or more thereof; or in liquid organosilicon compounds such as low viscosity linear and cyclic polydiorganosiloxanes.

When prepared, the polyorganosilicate resin comprises the M and Q units described above, and the polyorganosilicate resin further comprises units with silanol (silicon bonded hydroxyl) groups and may comprise neopentamer of formula $Si(OSiR^M_3)_4$, where $R^M$ is as described above. $Si^{29}$ Nuclear Magnetic Resonance (NMR) spectroscopy, as described in U.S. Pat. No. 9,593,209 at col. 32, Reference Example 2, may be used to measure molar ratio of M and Q units, where said ratio is expressed as {M(resin)+(M(neopentamer)}/{Q(resin)+Q(neopentamer)} and represents the molar ratio of the total number of triorganosiloxy groups (M units) of the resinous and neopentamer portions of the Polyorganosilicate Resin to the total number of silicate groups (Q units) in the resinous and neopentamer portions.

The Mn of the polyorganosilicate resin depends on various factors including the types of hydrocarbyl groups represented by $R^M$ that are present. The Mn of the polyorganosilicate resin refers to the number average molecular weight measured using GPC according to the procedure in U.S. Pat. No. 9,593,209 at col. 31, Reference Example 1, when the peak representing the neopentamer is excluded from the measurement. The Mn of the polyorganosilicate resin may be at least 1,500 g/mol. At the same time, the Mn of the polyorganosilicate may be up to 15,000 g/mol. Alternatively, Mn of the polyorganosilicate resin may be >3,000 g/mol to 8,000 g/mol. Alternatively, Mn of the polyorganosilicate resin may be 4,500 g/mol to 7,500 g/mol.

U.S. Pat. No. 8,580,073 at col. 3, line 5 to col. 4, line 31, is hereby incorporated by reference for disclosing silicone resins, which are suitable polyorganosilicate resin for use herein. The polyorganosilicate resin can be prepared by any suitable method, such as cohydrolysis of the corresponding silanes or by silica hydrosol capping methods. The polyorganosilicate resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et al. The method of Daudt, et al. described above involves reacting a silica hydrosol under acidic conditions with a hydrolyzable triorganosilane such as trimethylchlorosilane, a siloxane such as hexamethyldisiloxane, or mixtures thereof, and recovering a copolymer having M-units and Q-units. The resulting copolymers generally contain from 2 to 5 percent by weight of hydroxyl groups.

The intermediates used to prepare the polyorganosilicate resin may be triorganosilanes and silanes with four hydrolyzable substituents or alkali metal silicates. The triorganosilanes may have formula $R^M_3SiX^1$, where $R^M$ is as described above and $X^1$ represents a hydrolyzable substituent. Silanes with four hydrolyzable substituents may have formula $SiX^2_4$, where each $X^2$ is halogen, alkoxy or hydroxyl. Suitable alkali metal silicates include sodium silicate.

The polyorganosilicate resin prepared as described above is uncapped and typically contains silicon bonded hydroxyl groups, i.e., of formulae, $HOSi_{3/2}$ and/or $(HO)_xR^M_{(3-x)}SiO_{1/2}$, where subscript x is 1, 2, or 3. The polyorganosilicate resin may comprise up to 2% of silicon bonded hydroxyl groups. The concentration of silicon bonded hydroxyl groups present in the polyorganosilicate resin may be determined using FTIR spectroscopy according to ASTM Standard E-168-16. For certain applications, it may desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the polyorganosilicate resin can be converted to trihydrocarbyl siloxane groups or to a different hydrolyzable group by a process known as capping, e.g., reacting the polyorganosilicate resin with a silane, disiloxane, or disilazane containing the appropriate terminal group. Silanes containing hydrolyzable groups may be added in molar excess of the quantity required to react with the silicon bonded hydroxyl groups on the polyorganosilicate resin, thereby forming a capped resin.

One or more polyorganosilicate resins may be combined and used in the curable silicone pressure sensitive adhesive emulsion. For example, an uncapped resin having a relatively high amount of hydroxyl groups may be used in combination with a capped resin having al lower amount of hydroxyl groups than the uncapped resin. Alternatively, the resin or resins used may be capped.

Therefore, the polyorganosilicate resin may comprise (E-1) a capped resin as described above and (E-2) an uncapped resin as described above. The capped resin may have unit formula: $(R^M_3SiO_{1/2})_z(SiO_{4/2})_oX^2_p$, where $R^M$ and $X^2$ are as described above, and subscripts z and o have values such that o>1, and subscript z>4, a quantity (o+z) has a value sufficient to give the capped resin the Mn described above (e.g., 1500 g/mol to 5,000 g/mol, alternatively 2,000 g/mol to 5,000 g/mol, alternatively 2,500 g/mol to 4,900 g/mol, and alternatively 2,500 g/mol to 4,700 g/mol, and alternatively 2,900 g/mol to 4,700 g/mol), and subscript p has a value sufficient to give the capped resin a hydrolyzable group content as described above (e.g., 0 to <2%, alternatively 0 to 1.5%, and alternatively 0 to 1.0%). Starting material (E-2), the uncapped resin, may have unit formula $(R^M_3SiO_{1/2})_{z'}(SiO_{4/2})_{o'}X^2_{p'}$, where $R^M$ and $X^2$ are as described above and subscripts z' and o' have values such that o'>1, and subscript z'>4, a quantity (o'+z') has a value sufficient to give the capped resin the Mn described above (e.g., 1,500 g/mol to 5,000 g/mol, alternatively 2,000 g/mol to 5,000 g/mol, alternatively 2,500 g/mol to 4,900 g/mol, and alternatively 2,500 g/mol to 4,700 g/mol, and alternatively 2,700 g/mol to 4,700 g/mol), and subscript p' has a value sufficient to give the uncapped resin a hydrolyzable group content as described above (e.g., 2% to 10%).

The amount of polyorganosilicate resin may be sufficient to provide a weight ratio of starting material D)/starting material E) (and when present starting material H)). This is referred to as the [Resin/(Gum+Polymer)] ratio, which may have a value of of 0.2 to 2.0, alternatively 0.5 to 2.0. Alternatively, the amount of E) the polyorganosilicate resin may be at least 20%, alternatively 24% based on weight of the curable silicone pressure sensitive adhesive emulsion. At the same time, the amount may be sufficient to provide up to 30%, alternatively ≤27% polyorganosilicate resin on the same basis.

F) Surfactant

Starting material F) in the curable silicone pressure sensitive adhesive emulsion is an alcohol ethoxylate surfactant. The alcohol ethoxylate surfactant may be present in an amount of 5% based on combined weights of all starting materials in the curable silicone pressure sensitive adhesive emulsion. At the same time, the alcohol ethoxylate surfactant may be present in an amount s 10%, based on combined weights of all starting materials in the curable silicone pressure sensitive adhesive emulsion. Alternatively, the alcohol ethoxylate surfactant may be present in an amount of 5% to 7%, based on combined weights of all starting materials in the curable silicone pressure sensitive adhesive emulsion.

The alcohol ethoxylate surfactant may be a polyether modified polyorganosilicate (MQ) resin. Such resins may comprise M units of formula $R^E{}_3SiO_{1/2}$ and Q units of formula $SiO_{4/2}$, where each $R^E$ is independently selected from a polyether group and an alkyl group of 1 to 20 carbon atoms, such as the alkyl groups described above for $R^M$. Polyether modified MQ resins are known, and are disclosed, for example in PCT Publication WO2015/196400A1. The polyether modified MQ resin may be prepared, for example by capping the polyorganosilicate resin described above as starting material E) with a polyether functionality, as described in in U.S. Pat. No. 9,732,191.

Alternatively, the alcohol ethoxylate surfactant may be an organic alcohol ethoxylate, which is nonionic. Examples include 2-ethylhexanol ethylene oxide propylene oxide which is commercially available under the tradename ECO-SURF™ EH-6 from The Dow Chemical Company. Alternatively, the alcohol ethoxylate surfactant comprise poly (oxy-1,2-ethanediyl), alpha-[3,5-dimethyl-1-)2-methylpropyl)hexyl]-omega hydroxy-. The organic alcohol ethoxylate surfactant may be a mixture comprising water (up to 10%), the alcohol ethoxylate, such as poly(oxy-1,2-ethanediyl), alpha-[3,5-dimethyl-1-)2-methylpropyl)hexyl]-omega hydroxy- (at least 87%) and poly(ethylene oxide) (up to 3%). This mixture is commercially available as TERGITOL™ TMN-6 from The Dow Chemical Company.

G) Additional Water

Starting material G) is additional water, which may be as described above for starting material B). The amount of additional water may be added in one or more aliquots. When more than one aliquot is added, mixing may be performed between each addition. The total amount of water added may be sufficient to provide the curable silicone pressure sensitive adhesive emulsion with at least 20%, alternatively 24% water, based on weight of the emulsion. At the same time, the total amount of water added may be up to 40%, alternatively ≤35%. Alternatively, the total amount of water (B and G) in the emulsion may be >20% to <40%, alternatively 24% to 36%, based on weight of the curable silicone pressure sensitive adhesive.

H) Polymer

In addition to D) the gum, the curable silicone pressure sensitive adhesive emulsion may optionally further comprise H) a bis-hydroxyl-terminated polydiorganosiloxane polymer (polymer). The polymer may have formula:

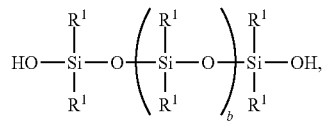

where $R^1$ is as described above and subscript b<subscript a. Subscript b has a value sufficient to give the polymer a viscosity ≤200,000 cst measured as described in Reference Example 15, below. Alternatively, subscript b may have a value sufficient to give the polymer a viscosity of 10,000 cst to 100,000 cst; alternatively 20,000 cst to 95,000 cst; alternatively 30,000 cst to 90,000 cst; alternatively 40,000 cst to 85,000 cst; and alternatively 50,000 cst to 80,000 cst.

Polymers suitable for use as starting material H) are known in the art and may be prepared by methods such as hydrolysis and condensation of the corresponding organohalosilanes or equilibration of cyclic polydiorganosiloxanes. Suitable polymers for use as starting material H) are exemplified by:
 i) bis-hydroxyl-terminated polydimethylsiloxane,
 ii) bis-hydroxyl-terminated poly(dimethylsiloxane/methylphenylsiloxane),
 iii) bis-hydroxyl-terminated poly(dimethylsiloxane/diphenylsiloxane),
 iv) phenyl,methyl,hydroxyl-siloxy-terminated polydimethylsiloxane,
 v) a combination of two or more of i) to iv). Alternatively, starting material H) may be selected from the group consisting of i), ii), and iii). Alternatively, starting material H) may be i).

The amount of starting material H) may be 0 to 20%, alternatively 0 to <13% based on weight of the curable silicone pressure sensitive adhesive emulsion. Alternatively starting material H), when used, may be added in an amount of 10% to 15%, alternatively 11% to 13%, based on weight of the curable silicone pressure sensitive adhesive emulsion.

I) Solvent

Starting material I) is an optional solvent. The solvent can be added during preparation emulsion, for example, to aid mixing and delivery of one or more starting materials. For example, D) the gum and/or E) the resin may be dissolved in a solvent before combining with the other starting materials to make the curable silicone pressure sensitive adhesive emulsion. The solvent may be an organic solvent such as a hydrocarbon, a ketone, an ester acetate, an ether. Suitable hydrocarbons for the solvent can be an aromatic hydrocarbon such as ethyl benzene, benzene, toluene, or xylene; an aliphatic hydrocarbon such as hexane, heptane, octane, or iso-paraffin; or a combination thereof. Alternatively, the solvent may be a glycol ether such as propylene glycol methyl ether, dipropylene glycol methyl ether, propylene glycol n-butyl ether. Suitable ketones include acetone, methyl ethyl ketone, or methyl isobutyl ketone. Suitable ester acetates include ethyl acetate or isobutyl acetate. Suitable ethers include diisopropyl ether or 1,4-dioxane. Alternatively, the solvent may be selected from the group consisting of toluene, xylene, heptane, ethyl benzene, and a combination of two or more thereof.

The amount of solvent will depend on various factors including the type of solvent selected and the amount and type of other starting materials. However, the amount of solvent may be 0 to 20%, alternatively 0% to 15%, alternatively 0 to 10%, alternatively 5% to 15%, and alternatively 5% to 10%, based on combined weights of all starting materials in the emulsion. All or a portion of the solvent may be added with one or more of the other starting materials. For example, the polyorganosilicate resin, and/or the catalyst, may be dissolved in a solvent before combination with the other starting materials in the curable silicone pressure sensitive adhesive emulsion. All or a portion of the solvent may optionally be removed after combining starting materials for the oil phase of the emulsion and before combining the starting materials that form the aqueous phase therewith.

J) Biocide

Starting material J) is a biocide that may optionally be added to the curable silicone pressure sensitive adhesive emulsion. Biocides are known in the art and are commercially available. For example, the biocide may be a preservative such as BIOBAN™ products) or KATHON™ products, which is an aqueous preservative comprising 5-chloro-2-methyl-4-isothiazolin-3-one and 2-methyl-4-isothiazolin-3-one. Alternatively, the biocide may comprise an algicide, such as KLARIX™ algicides, e.g., BIOBAN™, KATHON™, KLARIX™ and other biocides are commercially available from The Dow Chemical Company of Midland, Michigan, USA. The biocide may be added in an amount of 0 to 5%, alternatively 0.1% to 5%, based on weight of the curable silicone pressure sensitive adhesive emulsion.

Method of Making the Emulsion

The method for preparing the curable silicone pressure sensitive adhesive emulsion described above comprises:

1) preparing the dispersion described above, which comprises
   A) >0 to <55 weight % benzoyl peroxide;
   B) 0 to ≤25 weight % water; and
   C) >20 weight % a phenoxy-functional alcohol selected from the group consisting of 1-phenoxy-2-propanol and 2-phenoxyethan-1-ol; and
2) combining the dispersion with starting materials comprising
   D) the polydiorganosiloxane gum;
   E) the polyorganosilicate resin;
   F) the alcohol ethoxylate surfactant;
   G) the additional water.
   optionally H) the polydiorganosiloxane gum
   optionally I) the solvent
   optionally J) the biocide; thereby forming the emulsion.

The curable silicone pressure sensitive adhesive emulsion prepared by the method described herein is an oil in water (o/w) type emulsion, i.e., the emulsion comprises an oil phase dispersed in an aqueous phase. The oil phase will comprise starting materials comprising D), E), and F), and when present H) and I). Two or more of starting materials D), E), F), H), and I) may be combined with each other in any order before, during, or after preparing the dispersion in step 1) and before combining the dispersion prepared in step 1) with the starting materials in step 2).

For example, starting materials D), E), F), H), and I) may be combined by mixing in any order and by any convenient means for mixing high viscosity materials. Mixing to form a homogeneous mixture is also referred to as homogenizing. The method for combining the starting materials may occur concurrently or may be performed in a multiple step process. For example, starting materials D), E), and H) and I) when present may be may combined, and subsequently mixed via any of the techniques described below. Alternatively, starting materials D) and/or E) may be first combined and mixed with I) the solvent, and thereafter the resulting solution mixed with one or more other starting materials before step 2). Alternatively, starting material G) may be combined with starting materials D), E), and F) (and when present H) and/or I) and the resulting mixture emulsified before adding the dispersion from step 1). One skilled in the art would be able to select portions of the starting materials D), E), F), G), H) and I) for combining and mixing, depending on the selection of the quantity used and the specific mixing techniques utilized to combine the starting materials, which comprise the oil phase of the emulsion.

In step 2) the dispersion prepared in step 1) is combined with the remaining starting materials under conditions to emulsify the starting materials. Starting material G) the additional water may be added in one or more aliquots before and/or during step 2), and when more than one aliquot is used, the method may comprise mixing between additions.

Preparing the dispersion in step 1) and combining the dispersion and starting materials in before and during step 2) may occur by mixing in batch, semi-batch, or continuous processes. Mixing may occur, for example using, batch mixing equipment with medium/low shear such as change-can mixers, double-planetary mixers, conical-screw mixers, ribbon blenders, double-arm or sigma-blade mixers. Alternatively, batch equipment with high-shear and/or high-speed dispersers can be used in step 1) and/or step 2), and these include equipment such as that made by Charles Ross & Sons (NY), Hockmeyer Equipment Corp. (NJ); batch mixing equipment such as those sold under the tradename Speedmixer™; and batch equipment with high shear actions include Banbury-type (CW Brabender Instruments Inc., NJ) and Henschel type (Henschel mixers America, TX). Illustrative examples of continuous mixers/compounders include extruders single-screw, twin-screw, and multi-screw extruders, co-rotating extruders, such as those manufactured by Krupp Werner & Pfleiderer Corp (Ramsey, NJ), and Leistritz (NJ); extruders such as twin-screw counter-rotating extruders, two-stage extruders, twin-rotor continuous mixers, dynamic or static mixers or combinations of these equipment.

The method may optionally further comprise devolatilizing the curable silicone pressure sensitive adhesive emulsion. Devolatilizing may be performed by any convenient means, such as heating the emulsion under vacuum. Devolatilizing may be performed during water addition or before addition of the last aliquot of water to compensate for any water which may be removed during devolatilization. Devolatilizing may be performed, for example, with a devolatilizing extruder.

Method of Use

The curable silicone pressure sensitive adhesive emulsion prepared as described above may be used to form an adhesive article, e.g., a silicone pressure sensitive adhesive prepared by coating the curable silicone pressure sensitive adhesive emulsion on a substrate and curing.

Applying the curable silicone pressure sensitive adhesive emulsion to the substrate can be performed by any convenient means. For example, the curable silicone pressure sensitive adhesive emulsion may be applied onto a substrate by gravure coater, comma coater, offset coater, offset-gravure coater, roller coater, reverse-roller coater, air-knife coater, or curtain coater.

The substrate can be any material that can withstand the curing conditions (described below) used to cure the pressure sensitive adhesive composition to form the pressure sensitive adhesive on the substrate. For example, any substrate that can withstand heat treatment at a temperature equal to or greater than 180° C., alternatively 150° C. is suitable. Examples of materials suitable for such substrates including polymeric films such as polyimide (PI), polyetheretherketone (PEEK), polyethylene naphthalate (PEN), liquid-crystal polyarylate, polyamideimide (PAI), polyether sulfide (PES), polyethylene terephthalate (PET), polycarbonate (PC), thermoplastic polyurethane (TPU), polyethylene (PE), or polypropylene (PP). Alternatively, the substrate may be glass. The thickness of the substrate is not critical, however, the thickness may be 5 µm to 300 µm, alternatively 50 µm to 250 µm, alternatively 100 µm to 300 µm, alternatively 100 µm, and alternatively 50 µm. Alternatively, the substrate may be selected from the group consisting of PET, TPU, PC, and glass. Alternatively, the substrate may be a polymeric substrate, such as PET.

An adhesive article such as a film or tape may be prepared by applying the curable silicone pressure sensitive adhesive emulsion onto the substrate and curing, as described above. The method for preparing the adhesive article may further comprise removing the all, or a portion, of the water before and/or during curing. Removing water solvent may be performed by any convenient means, such as heating at a temperature that vaporizes the water without fully curing, e.g., heating at a temperature of 70° C. to 90° C., alternatively 50° C. to <100° C., and alternatively 70° C. to 80° C. for a time sufficient to remove all or a portion of the water (e.g., 30 seconds to 1 hour, alternatively 1 minute to 5 minutes).

Curing may be performed by heating at a temperature of 80° C. to 200° C., alternatively 90° C. to 180° C., alternatively 100° C. to 180° C., and alternatively 110° C. to 180° C. for a time sufficient to cure (e.g., for 30 seconds to an hour, alternatively 1 min to 5 min). Curing may be performed by placing the substrate in an oven. The amount of the curable silicone pressure sensitive adhesive emulsion to be applied to the substrate depends on the specific application, however, the amount may be sufficient such that after curing thickness of the pressure sensitive adhesive may be 5 µm to 100 µm, and for protective film the thickness may be 5 µm to 50 µm, alternatively 10 µm to 40 µm, and alternatively 15 µm to 40 µm.

The method described herein may optionally further comprise applying a removable release liner to the silicone pressure sensitive adhesive opposite the substrate, e.g., to protect the silicone pressure sensitive adhesive before use of the adhesive article. The adhesive article may be a protective film for use in a display device. Alternatively, the adhesive article may be an industrial tape. Alternatively, the silicone pressure sensitive adhesive may be useful in healthcare or personal care applications.

EXAMPLES

The starting materials used in the following illustrative examples are described in Table 1.

TABLE 1

| Starting Materials | |
| --- | --- |
| Abbreviation | Chemical Description |
| Gum 1 | Bis-OH-terminated polydimethylsiloxane with Mn of 300,000 g/mol to 305,000 g/mol |
| Polymer 1 | Bis-OH-terminated polydimethylsiloxane with viscosity = 80,000 cst |
| Solvent Borne Uncapped Resin | 70% OH-functional MQ resin solids + 30% BTEX (i.e., a mixture of benzene, |

TABLE 1-continued

| Starting Materials | |
| --- | --- |
| Abbreviation | Chemical Description |
| 1 | toluene, ethyl benzene and xylene) hydroxyl content = 3.2% (wt %), M/Q ratio = 0.72, and molecular weight = 4693 g/mol (Mn). |
| Solvent Borne Uncapped Resin 2 | 65% OH-capped MQ resin solids + 35% BTEX hydroxyl content = 3.4% (wt %), M/Q ratio = 0.72, and molecular weight = 4203 g/mol (Mn). |
| Solvent Borne Capped Resin 1 | 63% Methyl-capped MQ resin solids + 37% BTEX M/Q ratio of the resin solids was 1.4 hydroxyl content = 1.1% (wt %), M/Q = 0.96 and molecular weight = 4700 g/mol (Mn). |
| Solvent Borne Capped Resin 2 | 66% Methyl-capped MQ resin solids + 34% BTEX and M/Q ratio of the resin solids was 1.4 hydroxyl content = 1% (wt %), M/Q = 0.96 and molecular weight = 3700 (Mn). |
| OCS | a polyether modified polyorganosilicate (MQ) resin as described in WO2015/196400 |
| Organic Surfactant 1 | 2-ethylhexanol ethylene oxyide propylene oxide nonionic surfactant with CAS # 64366-70-7 |
| Organic Surfactant 2 | a mixture of water (10%); poly(oxy-1,2-ethanediyl), alpha-[3,5-dimethyl-1-)2-methylpropyl)hexyl]-omega hydroxy-(at least 87%); and poly(ethylene oxide) (up to 3%) |
| Water | Water |
| Curing Agent 1 | aminoethylaminopropyl trimethoxylsilane |
| Catalyst 1 BPO | Mixture of 75% benzoyl peroxide and 25% water |
| Catalyst 2 BPO paste | Dispersion of benzoyl peroxide (50%) in silicone oil (50%) |
| Dispersant 1 PPH | 1-phenoxy-2-propanol, 100% |
| Dispersant 2 EPH | 2-phenoxyethan-1-ol |
| Biocide 1 | emulsion, 1.5% solid content |

In this Reference Example 1, Emulsion 1 was prepared as follows. 8.5 parts of Gum 1 and 12.6 parts of Polymer 1 were mixed with 16.4 parts of Solvent Borne Uncapped Resin 1 and 23.1 parts of Solvent Borne Capped Resin 1. The resulting mixture was mixed with 6 parts of OCS to get a homogeneous mixture. Then 6 parts water was added with high shearing to form a thick O/W (oil in water) phase. 27.4 parts of water was added to dilute this phase to obtain Emulsion 1. The average particle size of Emulsion 1 was 0.3-0.4 um.

In this Reference Example 2, Emulsion 2 was prepared as follows. 21.1 parts of Gum 1 were mixed with 16.4 parts of Solvent Borne Uncapped Resin 1 and 23.1 parts of Solvent Borne Capped Resin 1. The resulting mixture was mixed with 6 parts of OCS to get a homogeneous mixture. Then 6 parts water was added with high shearing to form a thick O/W (oil in water) phase. 27.4 parts of water was added to dilute this phase and form Emulsion 2. The average particle size of Emulsion 2 was 1.5 um.

In this Reference Example 3, Emulsion 3 was prepared as follows. 21.1 parts of Gum 1 were mixed with 42.1 parts of Solvent Borne Capped Resin 2. The resulting mixture was mixed with 6.4 parts of OCS to get a homogeneous mixture. Then 6.4 parts water was added with high shearing to form a thick O/W (oil in water) phase. 24 parts of water was added to dilute this phase to obtain Emulsion 3. The average particle size of Emulsion 3 was 1.3 um.

In this Reference Example 4, Emulsion 4 was prepared as follows. 21.1 parts of Gum 1 were mixed with 17.7 parts of Solvent Borne Uncapped Resin 2 and 23.1 parts of Solvent Borne Capped Resin 1. The resulting mixture was mixed with 6.2 parts of OCS to form a homogeneous mixture. Then 6.2 parts water was added with high shearing to form a thick O/W (oil in water) phase. 25.7 parts of water was added to dilute this phase to obtain Emulsion 4. The average particle size of Emulsion 4 was 1.5 um.

In this Reference Example 5, Emulsion 5 was prepared as follows. 21.1 parts of Gum 1 were mixed with 37.8 parts of Solvent Borne Capped Resin 1. The resulting mixture was mixed with 6 parts of OCS to obtain a homogeneous mixture. Then 6 parts water was added with high shearing to form a thick O/W (oil in water) phase. 29.1 parts of water was added to dilute this phase to obtain Emulsion 5. The average particle size of Emulsion 5 was 1.7 um.

In this Reference Example 6, Emulsion 6 was prepared as follows. 8.5 parts of Gum 1 and 12.6 parts of Polymer 1 were mixed with 16.4 parts of Solvent Borne Uncapped Resin 1 and 23.1 parts of Solvent Borne Capped Resin 1. The resulting mixture was mixed with 6 parts of Organic Surfactant 1 to get a homogeneous mixture. Then 6 parts water was added with high shearing to form a thick O/W (oil in water) phase. 27.4 parts of water was added to dilute this phase to obtain Emulsion 6. The average particle size of Emulsion 6 was 0.2-0.3 um.

In this Reference Example 7, Emulsion 7 was prepared as follows. 8.5 parts of Gum 1 and 12.6 parts of Polymer 1 were mixed with 16.4 parts of Solvent Borne Uncapped Resin 1 and 23.1 parts of Solvent Borne Capped Resin 1. The resulting mixture was mixed with 6 parts of Organic Surfactant 2 to get a homogeneous mixture. Then 6 parts water was added with high shearing to form a thick O/W (oil in water) phase. 27.4 parts of water was added to dilute this phase to obtain Emulsion 7. The average particle size of Emulsion 7 was 0.35 um.

In this Reference Example 8, BPO dispersion samples were prepared as follows: Catalyst 1 was added to Dispersant 1 or Dispersant 2, then mixed for 30 min. BPO dispersion samples are summarized in Table 2, below. Amounts are shown in weight parts.

TABLE 2

| BPO Dispersion Samples | | | | | |
|---|---|---|---|---|---|
| Dispersion | I | II | III | IV | V |
| Catalyst 1 | 50 | 50 | 50 | 50 | 50 |
| Dispersant 1 | 50 | 25 | 18 | 137.5 | 0 |
| Dispersant 2 | 0 | 0 | 0 | 0 | 50 |
| Benzoyl Peroxide Content (wt %) | 37.5 | 50 | 55 | 20 | 37.5 |

Dispersion III formed a paste that was too dry to add into any of the Emulsions 1-7 prepared as described above.

In this Example 8, 50 weight parts Emulsion 1 was mixed with 1.21 weight parts Catalyst 1 with high speed shearing for 15 minutes. The resulting mixture was coated on a PET film of 50 μm thickness and cured at 80 C for 2 min and 180 c for 5 min. The resulting film appearance and cohesion were bad, and there was a high amount of residue on the steel plate after the cold peel test. Amounts of each starting material and results are summarized below in Table 3.

In this Example 9, 50 weight parts Emulsion 1 was mixed with 0.61 weight parts aminoethylaminopropyl trimethoxylsilane (Curing Agent 1) to form Sample 9. The mixture was coated on PET film of thickness 50 um and cured at 150° C. for 5 min. The 180° peel adhesion was 500 g/inch for 25-30 um dry coating thickness, and the performance of heat-resistance did not pass the cold peel for 200° C. In addition, the film appearance was poor. Amounts of each starting material and results are summarized below in Table 3.

In this Example 10, 50 weight parts of Emulsion 1 was mixed with 1.82 BPO paste from AkzoNobel (Catalyst 2) to form Sample 10. Sample 10 was coated on PET film of thickness 50 um and cured at 80° C. for 2 min and 180° C. for 5 min. Sample 10 was not cured by the BPO paste. Without wishing to be bound by theory, it is thought that the silicone oil inhibited the cure process. The cohesion of the PSA was bad. In addition, the film appearance was poor. Amounts of each starting material and results are summarized below in Table 3.

In this Reference Example 11, samples 11-14 were prepared by mixing 50 weight parts of Emulsion 1 prepared as described in Reference Example 1 with a dispersion prepared as described in Reference Example 8. Each resulting sample was then coated on PET film of thickness 50 um and cured at 80° C. for 2 min and 180° C. for 5 min. The 180° peel adhesion, 200 C cold peel adhesion and visual appearance were measured for each sample. Amounts of each starting material and results are shown below in Table 3.

In this Reference Example 12, samples 15 was prepared by mixing 50 weight parts of Emulsion 1 prepared as described in Reference Example 1 with 0.05 weight parts KATHON LX-150 and 2.42 weight parts of Dispersion I prepared as described in Reference Example 8. Resulting sample 15 was then coated on PET film of thickness 50 um and cured at 80° C. for 2 min and 180° C. for 5 min. The 180° peel adhesion, 200° C. cold peel adhesion and visual appearance were measured. Amounts of each starting material and results are shown below in Table 3.

TABLE 3

| PSA Emulsion Samples Prepared with Emulsion 1 | | | | | | | | |
|---|---|---|---|---|---|---|---|---|
| Starting Material | Sample 8 (Comp Ex 1) | Sample 9 (Comp Ex 2) | Sample 10 (Comp Ex 3) | Sample 11 (Inv Ex 1) | Sample 12 (Inv Ex 2) | Sample 13 (Inv Ex 7) | Sample 14 (Inv Ex 8) | Sample 15 (Inv Ex 11) |
| Emulsion 1 | 50 | 50 | 50 | 50 | 50 | 50 | 50 | 50 |
| Catalyst 1 | 1.21 | | | | | | | |
| Catalyst 2 | | | 1.82 | | | | | |
| Dispersion I | | | | 2.42 | | | | 2.42 |
| Dispersion II | | | | | | 1.82 | | |
| Dispersion IV | | | | | | | 4.55 | |
| Dispersion V | | | | | 2.42 | | | |
| Curing Agent 1 | | 0.61 | | | | | | |
| KATHON LX-150 | | | | | | | | 0.05 |
| Eval Results | | | | | | | | |
| Adhesion (g/in) | Residue | 500 | residue | 650 | 580 | 550 | 570 | 650 |
| 200° C. Cold Peel | Fail | Fail | Fail | Pass | Pass | Pass | Pass | Pass |
| Visual Appearance | Bad | Poor | Poor | Good | Good | Dots and transparent | White and pinholes | Good |

Samples 11-15 show that using a dispersion of benzoyl peroxide with water and an alcohol prepared according to Reference Example 8 can provide, to a PSA emulsion, the unexpected benefit of improved adhesion and cold peel results. Samples 11, 12, and 15 further demonstrate that superior visual appearance can also be obtained when OCS is used instead of an organic surfactant.

In this Reference Example 13, samples 16-21 were prepared as follows. 50 weight parts of an Emulsion prepared according to one of Reference Examples 2-7 above was combined with an amount of Dispersion I prepared according to Reference Example 8 above to form a curable PSA emulsion sample. Each sample was then coated on PET film of thickness 50 µm and cured at 8° C. for 2 min and 180° C. for 5 min. The 180° peel adhesion, 200 cold peel adhesion and visual appearance were measured for each cured sample. Amounts of each starting material and results are shown below in Table 4.

TABLE 4

| Starting Material | Sample 16 (Inv Ex 3) | Sample 17 (Inventive Example 4) | Sample 18 (Inventive Example 5) | Sample 19 (Inventive Example 6) | Sample 20 (Inventive Example 9) | Sample 21 (Inventive Example 10) |
|---|---|---|---|---|---|---|
| Emulsion 2 | 50 | 0 | 0 | 0 | 0 | 0 |
| Emulsion 3 | 0 | 50 | 0 | 0 | 0 | 0 |
| Emulsion 4 | 0 | 0 | 50 | 0 | 0 | 0 |
| Emulsion 5 | 0 | 0 | 0 | 50 | 0 | 0 |
| Emulsion 6 | 0 | 0 | 0 | 0 | 50 | 0 |
| Emulsion 7 | 0 | 0 | 0 | 0 | 0 | 50 |
| Dispersion I | 2.42 | 2.53 | 2.48 | 2.35 | 2.42 | 2.42 |

| Evaluation Results | Sample 16 (Inv Ex 3) | Sample 17 (Inventive Example 4) | Sample 18 (Inventive Example 5) | Sample 19 (Inventive Example 6) | Sample 20 (Inventive Example 9) | Sample 21 (Inventive Example 10) |
|---|---|---|---|---|---|---|
| Adhesion (g/in) | 724 | 1000 | 850 | 734 | 510 | 530 |
| 200° C. Cold Peel | Pass | Pass | Pass | Pass | Migration | Migration |
| Visual Appearance | Foggy and Opaque | Foggy and Opaque | Foggy and Opaque | Foggy and Opaque | Foggy and Transparent | Foggy and Transparent |

Reference Example 14—Test Method for Viscosity of the Gum

The standard method for measuring gum viscosity used an Alpha Technologies RAP 2000
1) This was run at 50° C. using a 1 deg arc at 100 rpm 1 degree arc equals 13.96% strain.
2) Between 5 and 5.5 g of gum was loaded between 0.023 mm polyester sheets.
   Use of polyester sheets does have a large effect especially at lower gum viscosities but made clean up considerably easier.
3) The sample was analysed for 6 mins with data being recorded via the software after 2, 3, 4, 5 and 6 mins. These were averaged to give the reported values. In some cases test time was reduced to 3 minutes with average values between 2 and 3 minutes being recorded.

Reference Example 15—Test Method for Viscosity of the Polymer

Brookfield viscometer procedures:
1) The RVDV-1 prime viscometer was powered on and the transducer zeroed. The guard leg was cleaned and attached to the rear of the viscometer pivot cup. The spindles were cleaned and inspected prior to use.
2) Liquid samples were dispensed into 16-oz polypropylene jars. The probe stem of a digital thermometer was inserted into the sample and used to stir the contents with vigor, but not to the extent of entraining new air bubbles. Stirring was intended to break up the internal network of mildly thixotropic to minimize time-dependence in the measurement process.
3) Spindles were submersed at an angle so as not to entrain new air bubbles. The spindles were then attached to the spindle coupling using a left-land thread. Spindle speeds for the RVDV-I Prime viscometer were selected from fixed increments in the range of 0.3 rpm to 100 rpm. The resistance exerted by displayed on the instrument.
4) During the course of these evaluations, a single point QC method was undergoing method development. A decision to use the RV4-spindle at 20 rpm was arrived at independently of conditions adoption by the conditions guar gum industry for QC testing 1% solution. The full range of viscosities spanned by the RV4-spindle and 20 rpm speed combination was from 1000 10000 cst. Therefore, the target range was a subset near the center of the full range. Instrument toque in the target viscosity range was approximately 50% of full scale (instrument tolerance decrease from 11% at 10% full scale torque to 3% at 50% full scale torque. From 50% to 100% full scale torque yields only an improvement to 2% instrument tolerance)

Reference Example 16—Test Method for Adhesion

Crepe paper was coated with a curable silicone pressure sensitive adhesive composition sample prepared and cured as described above. The coated crepe paper was cut into 1 inch wide tape and adhered on a cleaned standard steel plate. A 1 kg roll was applied two times. The resulting article was aged at room temperature for 30 mins. Then, an adhesion tester (ChemInstruments AR-1500) was used to peel the pressure sensitive adhesive to test the release force.

Reference Example 17—test method for 200° C. Cold Peel. Crepe paper was coated with a curable silicone pressure sensitive adhesive composition sample prepared and cured as described above. The coated crepe paper was cut into 1 inch wide tape strips, which were adhered on a cleaned standard steel plate. The resulting samples were aged at room temperature for 30 mins. The samples were then placed into an oven at 200 C for 30 mins. The samples were then placed outside the oven and cooled to room temperature under ambient conditions. The tape was peeled off the substrate and residue and migration were visually assessed.

Reference Example 18—Visual Appearance of Each Sample was Assessed with the Naked Eye Usage of Terms The BRIEF SUMMARY OF THE INVENTION and ABSTRACT are hereby incorporated by reference. All amounts, ratios, and percentages are by weight unless otherwise indicated by the context of the specification. The articles 'a', 'an', and 'the' each refer to one or more, unless otherwise indicated by the context of the specification. The disclosure of ranges includes the range itself and also anything subsumed therein, as well as endpoints. For example, disclosure of a range of 20 to 50 includes not only the range of 20 to 50, but also 20, 30, 37.5, 45, and 50 individually, as well as any other number subsumed in the range. Furthermore, disclosure of a range of, for example, 20 to 50 includes the subsets of, for example, 20 to 37, 38 to 45, and 46 to 50 as well as any other subset subsumed in the range. Similarly, the disclosure of Markush groups includes the entire group and also any individual members and subgroups subsumed therein. For example, disclosure of the Markush group alkyl, alkenyl, and aryl includes the member alkyl individually; the subgroup alkyl and aryl; and any other individual member and subgroup subsumed therein.

Abbreviations used in this application are as defined below in Table 5.

TABLE 5

| Abbreviation | Definition |
| --- | --- |
| ° C. | Degrees Celsius |
| cm | centimeter |
| cst | units for dynamic viscosity measured as described above |
| FTIR | Fourier Transform-Infra Red |
| g/in | Grams per inch (g/2.54 cm) |
| g/mol | Grams per mole |
| GPC | Gel permeation chromatography |
| Me | methyl |
| mm | millimeters |
| Mn | Number average molecular weight |
| Ph | phenyl |
| rpm | revolutions per minute |
| µl or uL | microliters |
| µm or um | micrometers |
| Vi | vinyl |

Mn of the gum and other starting materials (such as E) the polyorganosilicate resin and H) the polymer) may be measured by GPC according to the following technique. The chromatographic equipment was a Waters 2695 Separations Module equipped with a vacuum degasser, and a Waters 2414 refractive index detector. The separation was made with three Styragel™ HR columns (300 mm×7.8 mm) (molecular weight separation range of 100 to 4,000,000), preceded by a Styragel™ guard column (30 mm×4.6 mm). The analyses were performed using certified grade toluene flowing at 1.0 mL/min as the eluent, and the columns and detector were both heated to 45° C. 0.5% wt./v sample was prepared by weighing 0.025 g of neat sample into a 12-mL glass vial and diluting with 5 mL toluene. Sample solution was transferred to a glass autosampler vial after centrifuged or filtered through 0.45 µm PTFE filter. An injection volume of 100 µl was used and data was collected for 38 minutes. Data collection and analyses were performed using Waters Empower GPC software. Molecular weight averages were determined relative to a calibration curve (3rd order) created using polystyrene standards covering the molecular weight range of 370 g/mol-1,270,000 g/mol.

Embodiments of the Invention

In a first embodiment, a method for preparing a curable silicone pressure sensitive adhesive emulsion comprises:
1) preparing a dispersion comprising
   A) >0 to <55 weight % benzoyl peroxide;
   B) 0 to ≤25 weight % water; and
   C) >20 weight % a phenoxy-functional alcohol selected from the group consisting of 1-phenoxy-2-propanol and 2-phenoxyethan-1-ol; and
2) combining the dispersion with starting materials comprising
   D) a bis-hydroxyl-terminated polydiorganosiloxane gum;
   E) a polyorganosilicate resin;
   F) an alcohol ethoxylate surfactant;
   G) additional water;
   optionally H) a bis-hydroxyl-terminated polydiorganosiloxane polymer;
   optionally I) a solvent; and
   optionally J) a biocide.

In a second embodiment, the method of the first embodiment further comprises:
   i) mixing starting materials comprising D) and E), and optionally H) and/or I);
   ii) adding starting material F) to a product of step i) and mixing;
   iii) adding starting material G) to a product of step ii) and emulsifying; and thereafter
   iv) adding the dispersion from step 1) to a product of step iii).

In a third embodiment, in the method of the first embodiment or the second embodiment, the dispersion comprises 20% to 50% A) benzoyl peroxide, 2% to 25% B) water, and 25% to 78% 1-phenoxy-2-propanol.

In a fourth embodiment, in the method of the first embodiment or the second embodiment, the dispersion comprises 20% to 50% A) benzoyl peroxide, 2% to 25% B) water, and 25% to 78% 2-phenoxyethan-1-ol.

In a fifth embodiment, in the method of any one of the preceding embodiments, starting material D) is present in an amount of 7 weight % to 30 weight %, based on weight of the emulsion, and starting material D) has formula

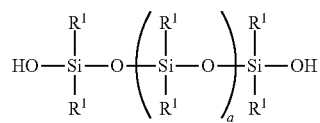

where each $R^1$ is an independently selected monovalent hydrocarbon group; and subscript a has a value sufficient to give the gum a number average molecular weight >300,000 g/mol.

In a sixth embodiment, in the method of any one of the preceding embodiments, starting material E) is present in an amount sufficient to provide a weight ratio of starting material E)/[starting material D)+starting material H)] [Resin/(Gum+Polymer) Ratio] of 0.5 to 2.0, and starting material E) is selected from the group consisting of:

E-1) a capped resin of unit formula: $(R^M_3SiO_{1/2})_z$ $(SiO_{4/2})_o X^2_p$, where each $R^M$ is an independently selected monovalent hydrocarbyl group, each $X^2$ is a hydrolyzable substituent, subscripts z and o have values such that o>1, and subscript z>4, a quantity (o+z) has a value sufficient to give the capped resin an Mn of 1500 g/mol to 5,000 g/mol; and subscript p has a value sufficient to give the capped resin a hydrolyzable group content of 0 to <2%;

E-2) an uncapped resin of unit formula $(R^M_3SiO_{1/2})_{z'}$ $(SiO_{4/2})_{o'} X^2_{p'}$, where subscripts z' and o' have values such that o'>1, and subscript z'>4, a quantity (o'+z') has a value sufficient to give the capped resin an Mn of 1,500 g/mol to 5,000 g/mol; and subscript p' has a value sufficient to give the uncapped resin a hydrolyzable group content of ≥2% to 10%. alternatively 2,000

In a seventh embodiment, in the method of any one of the preceding embodiments, starting material F) is present in an amount of 5% to 10%, based on weight of the curable silicone pressure sensitive adhesive emulsion, and starting material F) is selected from the group consisting of a polyether modified polyorganosilicate (MQ) resin and an organic alcohol ethoxylate.

In an eighth embodiment, in the method of any one of the preceding embodiments, starting material G) is added in an amount of 20 weight % to 40 weight % based on weight of the curable silicone pressure sensitive adhesive emulsion.

In a ninth embodiment, in the method of any one of the preceding embodiments, starting material H) the bis-hydroxyl-terminated polydiorganosiloxane polymer is present in an amount of 10 weight % to 15 weight % of the curable silicone pressure sensitive adhesive emulsion, and the bis-hydroxyl-terminated polydiorganosiloxane polymer has formula

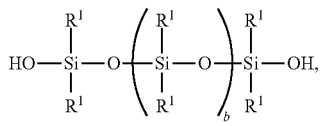

where each $R^1$ is an independently select monovalent hydrocarbyl group, and subscript b has a value sufficient to give the bis-hydroxyl-terminated polydiorganosiloxane polymer a viscosity s 200,000 cs.

In a tenth embodiment, in the method of any one of the preceding embodiments, starting material I) is present in an amount >0 weight % to 20 weight % and comprises a mixture of aromatic hydrocarbons.

In an eleventh embodiment, in the method of any one of the preceding embodiments, starting material J) is present in an amount of 0.1% to 5%.

In a twelfth embodiment, in the method of any one of the preceding embodiments further comprises devolatilizing the curable silicone pressure sensitive adhesive emulsion, the method during step 2) and/or before completion of adding G) the water in step 2).

In a thirteenth embodiment, the method of any one of the preceding embodiments further comprises forming an adhesive article by a technique comprising applying the curable silicone pressure sensitive adhesive emulsion on a substrate and curing.

In a fourteenth embodiment, the method of the thirteenth embodiment further comprises using the adhesive article for an industrial tape.

In a fifteenth embodiment, the method of the thirteenth embodiment further comprises using the adhesive article for a personal care product.

In a sixteenth embodiment, the method of the thirteenth embodiment further comprises using the adhesive article for a healthcare product.

What is claimed is:

1. A method for preparing a curable silicone pressure sensitive adhesive emulsion, the method comprising:
   1) preparing a dispersion comprising, based on the weight of the dispersion
      A) >0 to <55 weight % benzoyl peroxide;
      B) 0 to ≤25 weight % water; and
      C) >20 weight % a phenoxy-functional alcohol selected from the group consisting of 1-phenoxy-2-propanol and 2-phenoxyethan-1-ol; and
   2) combining the dispersion with starting materials comprising
      D) a bis-hydroxyl-terminated polydiorganosiloxane gum;
      E) a polyorganosilicate resin;
      F) an alcohol ethoxylate surfactant;
      G) additional water;
      optionally H) a bis-hydroxyl-terminated polydiorganosiloxane polymer;
      optionally I) a solvent; and
      optionally J) a biocide.

2. The method of claim 1, where the method further comprises:
   i) mixing starting materials comprising D) and E), and optionally H) and/or I);
   ii) adding starting material F) to a product of step i) and mixing;
   iii) adding starting material G) to a product of step ii) and emulsifying; and thereafter
   iv) adding the dispersion from step 1) to a product of step iii).

3. The method of claim 1, where the dispersion comprises 20% to 50% A) benzoyl peroxide, 2% to 25% B) water, and 25% to 78% 1-phenoxy-2-propanol.

4. The method of claim 1, where the dispersion comprises 20% to 50% A) benzoyl peroxide, 2% to 25% B) water, and 25% to 78% 2-phenoxyethan-1-ol.

5. The method of claim 1, where starting material D) is present in an amount of 7 weight % to 30 weight %, based on weight of the emulsion, and starting material D) has formula

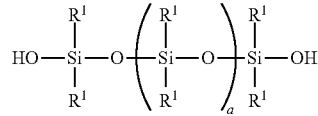

where each $R^1$ is an independently selected monovalent hydrocarbon group; and subscript a has a value sufficient to give the gum a number average molecular weight ≥300,000 g/mol.

6. The method of claim 1, where starting material E) is present in an amount sufficient to provide a weight ratio of starting material E)/[starting material D)+starting material H)][Resin/(Gum+Polymer) Ratio] of 0.5 to 2.0, and starting material E) is selected from the group consisting of:

E-1) a capped resin of unit formula: $(R^M_3SiO_{1/2})_z$ $(SiO_{4/2})_o X^2_p$, where each $R^M$ is an independently selected monovalent hydrocarbyl group, each $X^2$ is a hydrolyzable substituent, subscripts z and o have values such that o>1, and subscript z>4, a quantity (o+z) has a value sufficient to give the capped resin an Mn of 1500 g/mol to 5,000 g/mol; and subscript p has a value sufficient to give the capped resin a hydrolyzable group content of 0 to <2%;

E-2) an uncapped resin of unit formula $(R^M_3SiO_{1/2})_{z'}$ $(SiO_{4/2})_{o'} X^2_{p'}$, where each $R^M$ is an independently selected monovalent hydrocarbyl group, each $X^2$ is a hydrolyzable substituent, subscripts z' and o' have values such that o'>1, and subscript z'>4, a uncapped quantity (o'+z') has a value sufficient to give the uncapped resin an Mn of 1,500 g/mol to 5,000 g/mol; and subscript p' has a value sufficient to give the uncapped resin a hydrolyzable group content of ≥2% to 10%.

7. The method of claim 1, where starting material F) is present in an amount of 5% to 10%, based on weight of the curable silicone pressure sensitive adhesive emulsion, and starting material F) is selected from the group consisting of a polyether modified polyorganosilicate resin and an organic alcohol ethoxylate.

8. The method of claim 1, where starting material G) is added in an amount of 20 weight % to 40 weight % based on weight of the curable silicone pressure sensitive adhesive emulsion.

9. The method of claim 1, where H) the bis-hydroxyl-terminated polydiorganosiloxane polymer is present in an amount of 10 weight % to 15 weight % of the curable silicone pressure sensitive adhesive emulsion, and the bis-hydroxyl-terminated polydiorganosiloxane polymer has formula

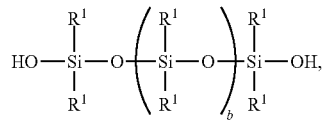

where each $R^1$ is an independently selected monovalent hydrocarbyl group, and subscript b has a value sufficient to give the bis-hydroxyl-terminated polydiorganosiloxane polymer a viscosity ≤200,000 cs.

10. The method of claim 1, where starting material I) is present in an amount >0 weight % to 20 weight % and comprises a mixture of aromatic hydrocarbons based on the combined weights of all starting materials in the emulsion.

11. The method of claim 1, where starting material J) is present in an amount of 0.1% to 5% based on the weight of the curable silicone pressure sensitive adhesive emulsion.

12. The method of claim 1, further comprising forming an adhesive article by a technique comprising applying the curable silicone pressure sensitive adhesive emulsion on a substrate and curing.

13. The method of claim 12, further comprising using the adhesive article for an industrial tape or a personal care product.

14. The method of claim 12, further comprising using the adhesive article for a healthcare product.

* * * * *